US006666736B2

(12) United States Patent
Fuse et al.

(10) Patent No.: US 6,666,736 B2
(45) Date of Patent: Dec. 23, 2003

(54) WATER JET PROPULSION APPARATUS (75) Inventors: Tomohiro Fuse, Saitama (JP); Masahiko Tsuchiya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/238,594

(22) Filed: Sep. 11, 2002

(65) Prior Publication Data

US 2003/0064638 A1 Apr. 3, 2003

(30) Foreign Application Priority Data

Sep. 18, 2001 (JP) ........................................ 2001-284065

(51) Int. Cl.⁷ .............................................. B63H 11/00
(52) U.S. Cl. .......................................... 440/38; 60/221
(58) Field of Search ............................. 440/38, 39, 40, 440/42, 46, 47; 60/221, 222; 415/170.1

(56) References Cited

U.S. PATENT DOCUMENTS

| 3,484,113 A | * | 12/1969 | Moore | 277/366 |
| 3,839,859 A | * | 10/1974 | Woell, Jr. | 60/221 |
| 4,183,540 A | * | 1/1980 | Hytonen | 277/388 |
| 5,605,436 A | * | 2/1997 | Pedersen | 415/170.1 |
| 5,810,553 A | * | 9/1998 | Pedersen | 415/170.1 |
| 5,871,381 A | * | 2/1999 | Lin | 440/38 |
| 5,975,966 A | * | 11/1999 | Lin | 440/47 |
| 6,171,158 B1 | * | 1/2001 | Henmi et al. | 440/38 |
| 6,250,876 B1 | * | 6/2001 | Hogholt | 415/17 |
| 6,273,768 B1 | * | 8/2001 | Blanchard | 440/38 |

FOREIGN PATENT DOCUMENTS

JP         2548210       5/1997

* cited by examiner

Primary Examiner—S. Joseph Morano
Assistant Examiner—Lars A. Olson
(74) Attorney, Agent, or Firm—Birch, Stewart, Kolasch & Birch, LLP (57) ABSTRACT

A water jet propulsion apparatus is provided with an impeller rotatably disposed in a duct forming a channel. A waterproof seal is provided between a collar provided around an impeller shaft rotatably supported within the duct and coupled to the impeller and the stator. The collar is coupled to the impeller via the waterproof seal. The impeller shaft is screwed to the rear part of the impeller, and a drive shaft is spline-connected to the front part of the impeller. A rubber buffer for the rear end of the drive shaft is provided between the front end of the impeller shaft in the impeller and the rear end of the drive shaft. The peripheral portion of the buffer is formed in a shape such that air escapes from the impeller shaft side toward the drive shaft side when the impeller shaft is secured for preventing contact of water with the impeller shaft.

12 Claims, 6 Drawing Sheets

WATER JET PROPULSION APPARATUS

CROSS-REFERENCES TO RELATED APPLICATIONS

This nonprovisional application claims priority under 35 U.S.C. §119(a) on Patent Application No. 2001-284065 filed in Japan on Sep. 18, 2001, the entirety of which is herein incorporated by reference.

BACKGROUND OF THE INVENTION

1. Field of the Invention

The present invention relates to a water jet propulsion apparatus, and more particularly to a water jet propulsion apparatus for use in a saddle type watercraft.

2. Description of the Background Art

Figure 6:
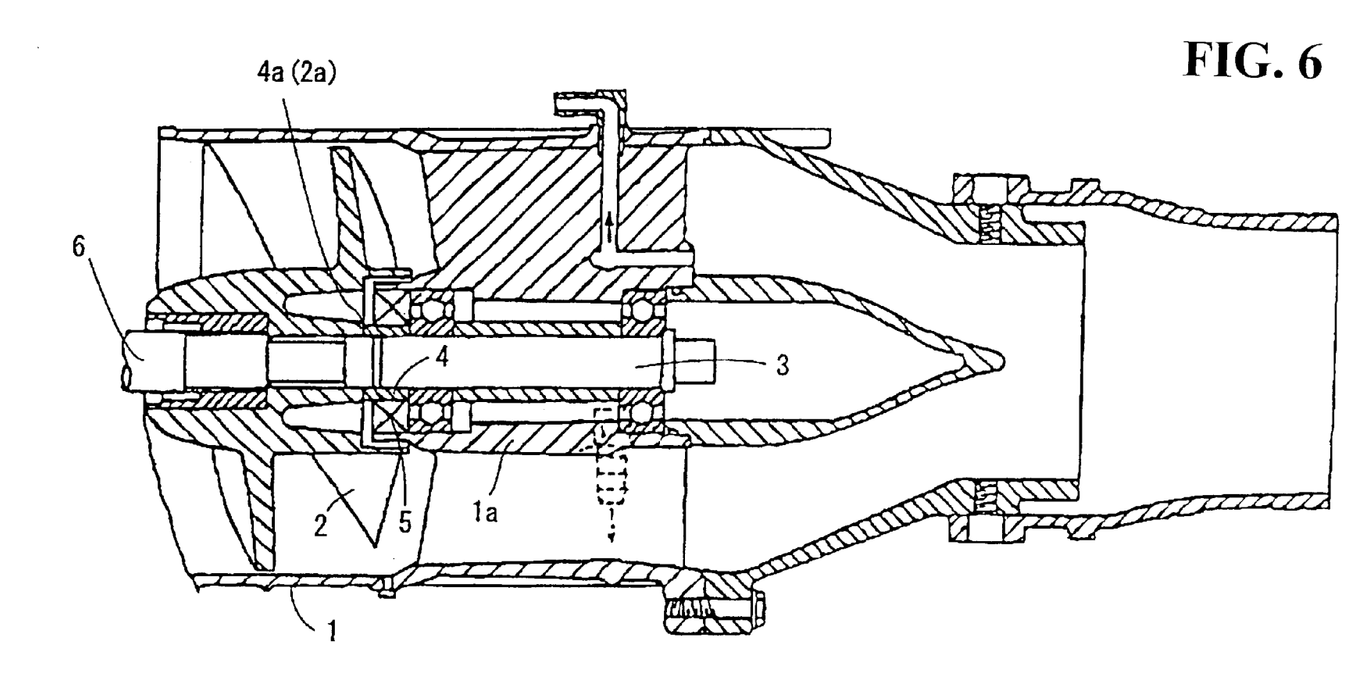
FIG. 6 is a view of an exemplary structure of the background art.

As shown in FIG. 6, a water jet propulsion apparatus for a small boat is known int the background art, e.g., Japanese Utility Model Registration No. 2,548,210, the entirety of which is hereby incorporated by reference. The water jet propulsion apparatus is attached to a rear part of a boat and has a stator (duct) 1 forming a channel, an impeller 2 rotatably disposed within the stator 1, and an impeller shaft 3 rotatably supported by a bearing 1a in the stator 1 and coupled to the rear part of the impeller 2. A collar 4 is provided around the impeller shaft 3, and a waterproof seal 5 is provided between the collar 4 and the bearing 1a of the stator 1. A drive shaft 6 is coupled to the front part of the impeller 2.

When the drive shaft 6 is driven by an engine (not shown), the impeller 2 is rotated and a water stream is jetted rearward (to the right in the drawing), thereby propelling the boat body. In the above-described conventional water jet propulsion apparatus, since the front end 4a of the collar 4 is only in contact with the rear end 2a of the impeller 2, there is a problem in that water enters from a gap between the front end 4a of the collar 4 and the rear end 2a of the impeller 2. The water comes into contact with the surface of the impeller shaft 3, and corrodes the surface of the impeller shaft 3. This problem can be solved by making the impeller shaft 3 of a corrosion-resistant material,e g., such as stainless steel. However, the impeller shaft becomes undesirably expensive when corrosion resistant materials such as stainless steel are used in the design.

SUMMARY OF THE INVENTION

The present invention overcomes the shortcomings associated with the background art and achieves other advantages not realized by the background art.

An object of the present invention is to provide a water jet propulsion apparatus that can solve the above problems and prevent water from coming into contact with the impeller shaft.

One or more of these and other objects are accomplished by a water jet propulsion apparatus comprising a stator forming a channel; an impeller rotatably disposed within the stator; an impeller shaft rotatably supported in the stator and coupled to the impeller; a collar provided around the impeller shaft; and a waterproof seal provided between the collar and the stator, wherein the collar is coupled to the impeller via the waterproof seal.

One or more of these and other objects are further accomplished by a water jet propulsion apparatus comprising a stator forming a channel; an impeller rotatably disposed within the stator; an impeller shaft rotatably supported in the stator and coupled to the impeller, wherein the impeller shaft is screwed to a rear part of the impeller; a collar provided around the impeller shaft; a waterproof seal provided between the collar and the stator, wherein the collar is coupled to the impeller via the waterproof seal; a drive shaft being spline-connected to the front part of the impeller; and a rubber buffer for a rear end of the drive shaft being provided within the propeller between a front end of the impeller shaft and the rear end of the drive shaft, the buffer including an engagement portion for engaging a screw hole in the boss of the impeller and a large diameter portion being attached to an internal face of the boss of the impeller.

In the aforementioned water jet propulsion apparatus, the collar is coupled to the impeller via the waterproof seal. Consequently, in the water jet propulsion apparatus, water does not enter from the gap between the collar and the impeller toward the impeller shaft. Therefore, corrosion on the surface of the impeller shaft is reduced or eliminated. As a result, it is not always necessary to make the impeller shaft of a corrosion-resistant material. Since a buffer for the rear end of the drive shaft is provided in the impeller between the front end of the impeller shaft in the impeller and the rear end of the drive shaft, shock at the time of attaching the impeller to the rear end of the drive shaft is lessened.

Without the present invention, at the time of screwing the impeller shaft to the rear part of the impeller, air (or grease) existing between the impeller shaft and the buffer cannot escape. Accordingly, the buffer may be excessively deformed. In contrast, the peripheral portion of the buffer is formed in a shape such that air escapes from the impeller shaft side toward the drive shaft side when the impeller shaft is screwed. Thus, excessive deformation of the buffer can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
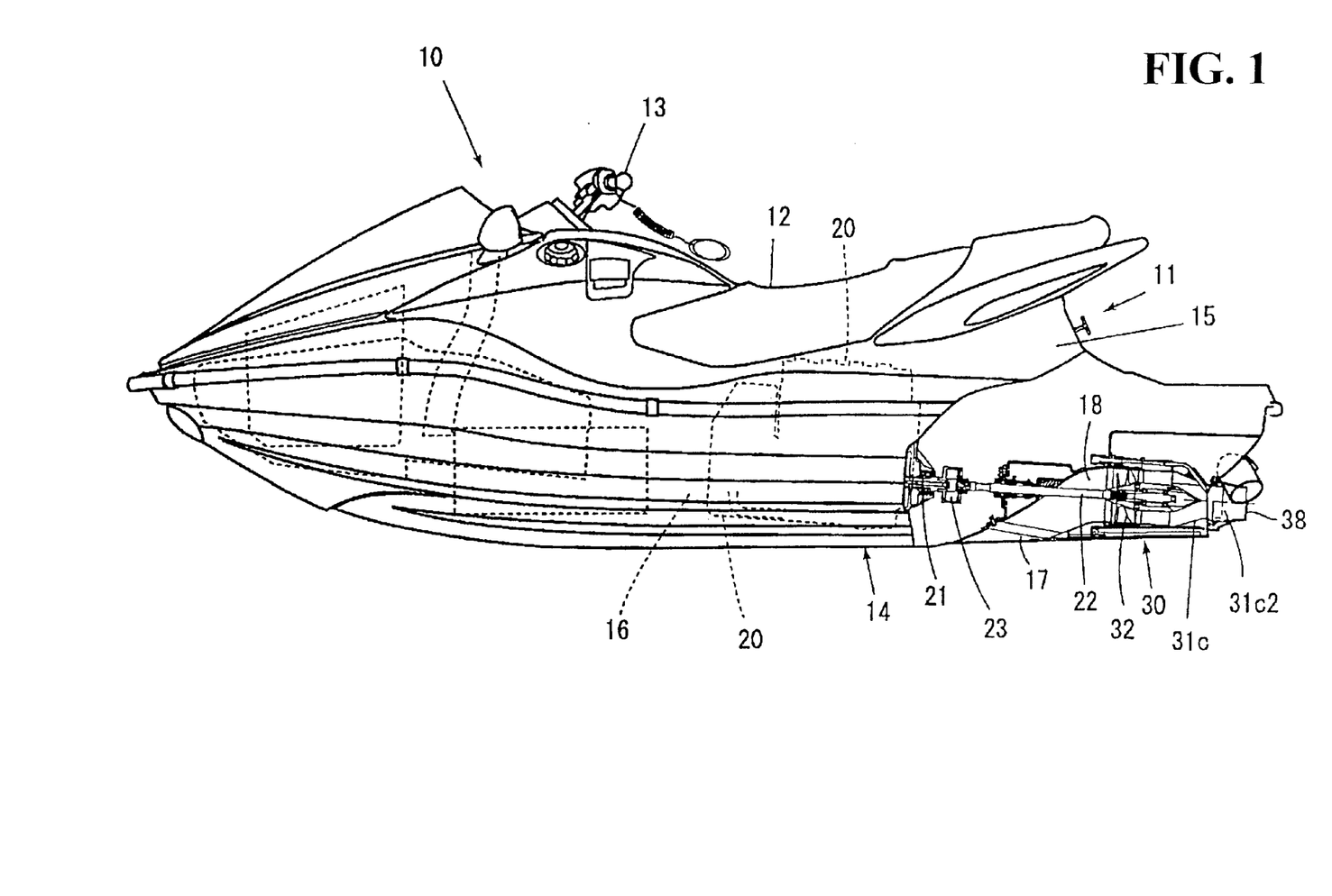
FIG. 1 is a partial, schematic side view showing an example of a small planing boat having a water jet propulsion apparatus according to an embodiment of the present invention.
Figure 2:
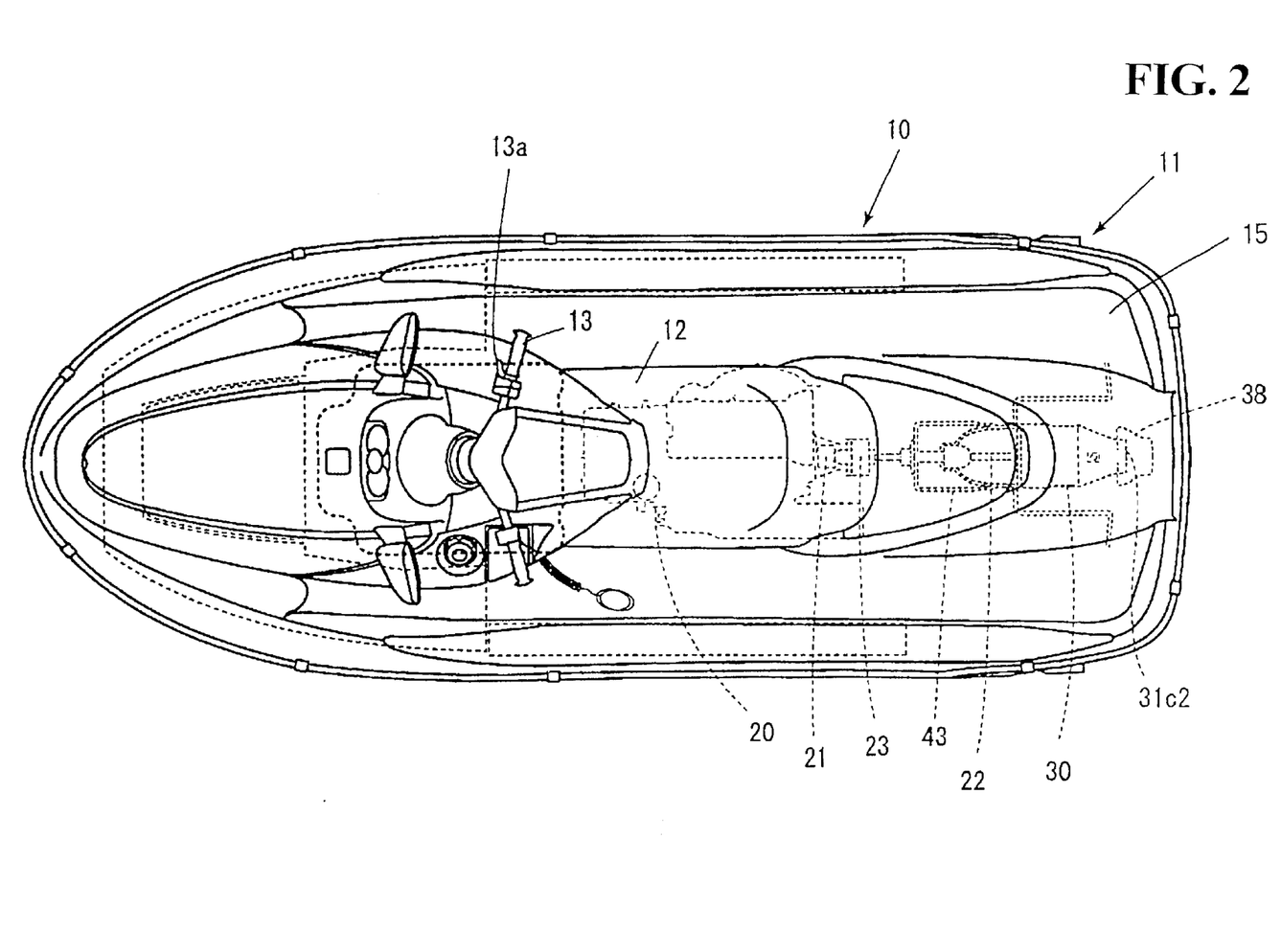
FIG. 2 is a schematic plan view of the small planing boat of FIG. 1.
Figure 3:
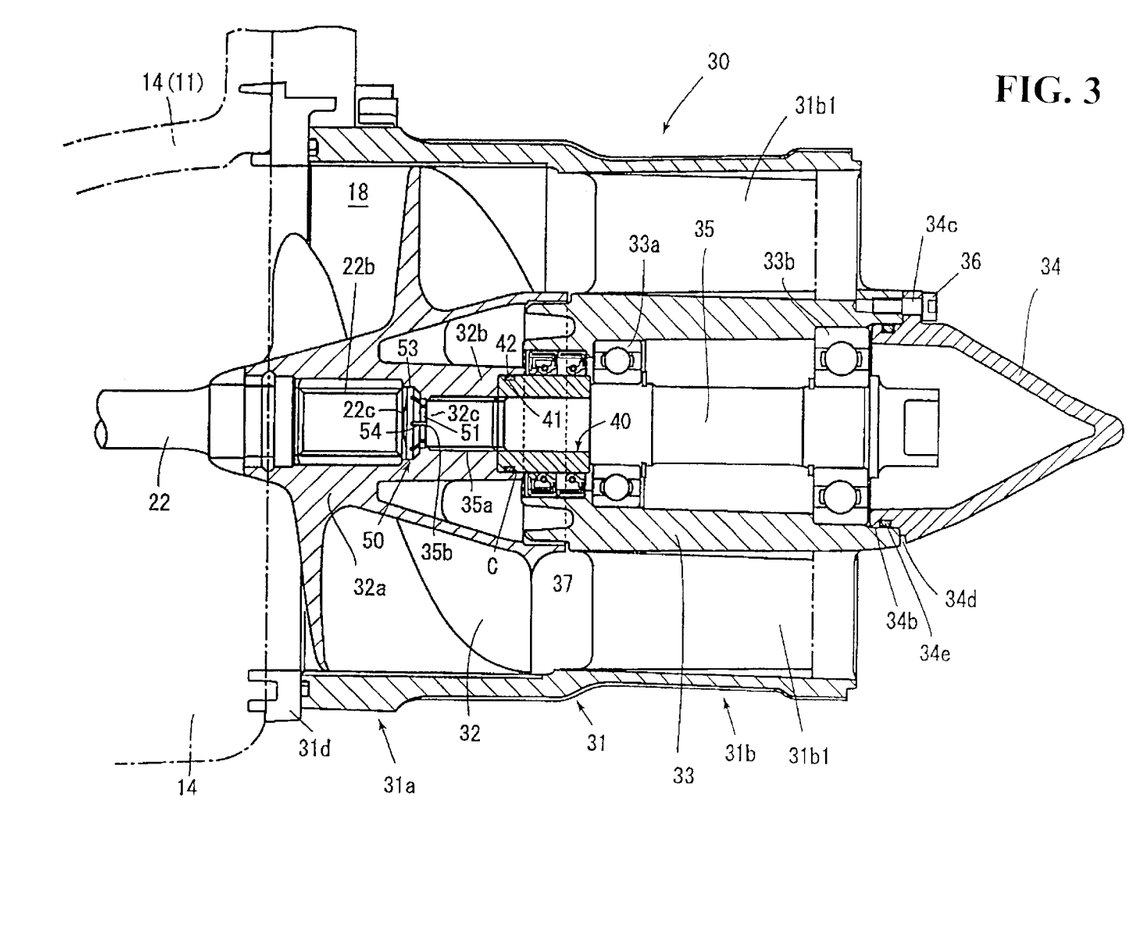
FIG. 3 is a cross sectional view of a jet pump.
Figure 4A:
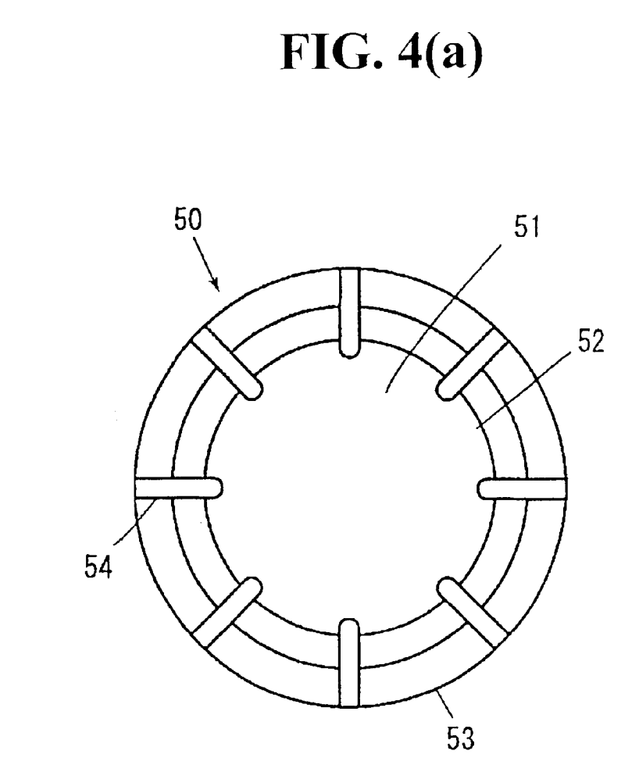
FIG. 4(a) is a rear view of a boat body.
Figure 4B:
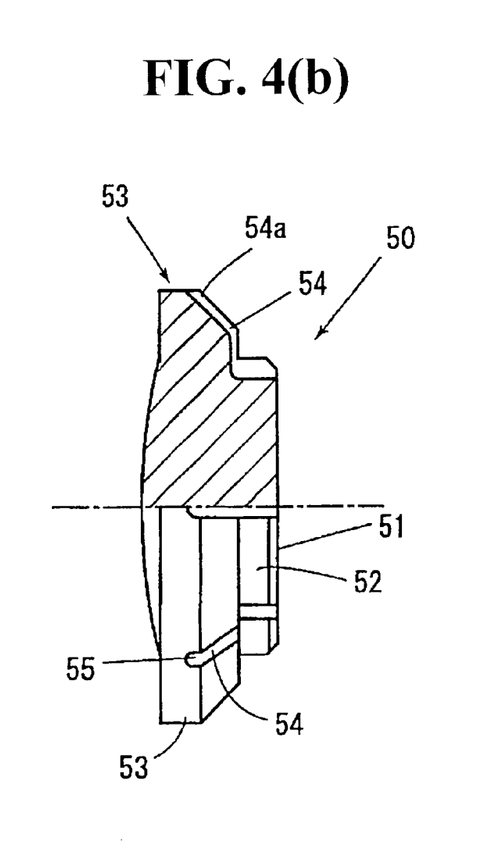
FIG. 4(b) is a partial, side view, showing a buffer.
Figures 5A, 5B:
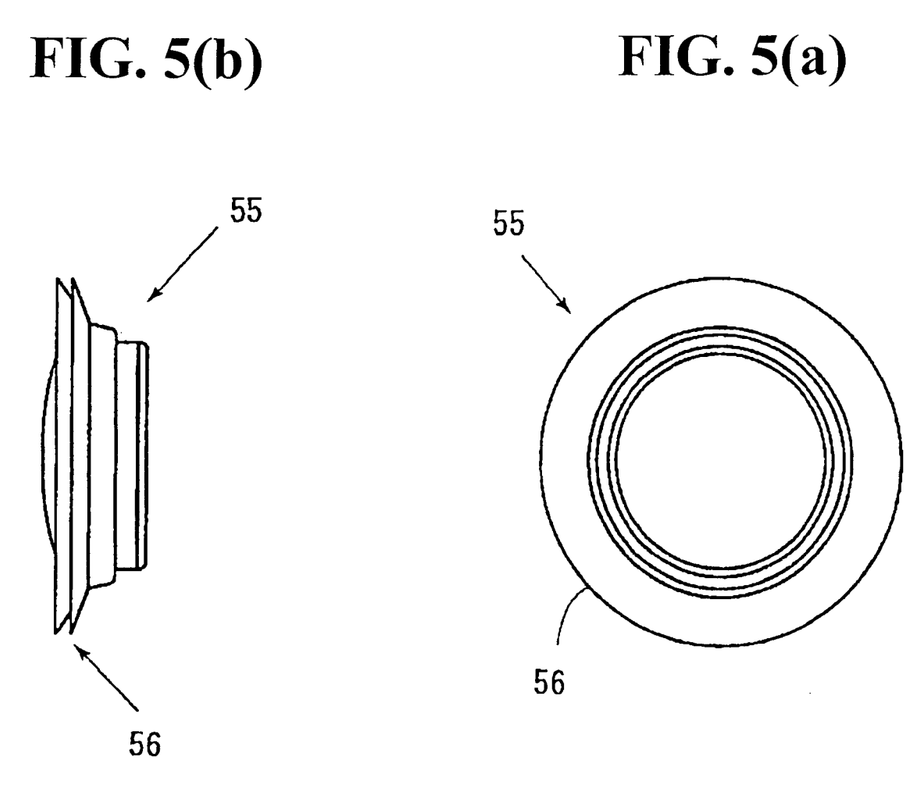
FIG. 5(a) is rear view of the boat body.
FIG. 5(b) is a side view showing a modification of the buffer.

The present invention will hereinafter be described with reference to the accompanying drawings. FIG. 1 is a partial, schematic side view showing an example of a small planing boat having a water jet propulsion apparatus according to an embodiment of the present invention. FIG. 2 is a schematic plan view of the small planing boat of FIG. 1. FIG. 3 is a cross sectional view of a jet pump 30. FIG. 4(a) is a rear view of a boat body. FIG. 4(b) is a partial, side view, showing a buffer 50. FIG. 5(a) is rear view of the boat body. FIG. 5(b) is a side view showing a modification of the buffer.

A small planing boat having a water jet propulsion apparatus according to an embodiment of the present invention is shown in FIGS. 1 and 2. This small planing boat 10 is a saddle-type, personal watercraft where an occupant sits on a seat 12 of a boat body 11. The occupant can drive the small planing boat 11 by gripping a steering handle 13 with a throttle lever. The boat body 11 has a floating body structure obtained by bonding a hull 14 and a deck 15 and forming a space 16 on the inside. In the space 16, an engine 20 is mounted on the hull 14, and a water jet propulsion apparatus (hereinbelow, also called a jet pump) 30 driven by the engine 20 is provided in the rear part of the hull 14.

The jet pump 30 has an impeller 32 disposed in a channel 18 extending from an intake 17 opening in the bottom of the boat to a jet port 31c2 opened in the rear end of the boat and a deflector 38. A shaft (drive shaft) 22 for driving the impeller 32 is coupled to an output shaft 21 of the engine 20 via a coupler 23. Therefore, when the impeller 32 is rotated by the engine 20 via the coupler 23 and shaft 22, water taken from intake 17 is jetted from the jet port 31c2 to the outside via the deflector, thereby propelling the boat body 11. The number of revolutions of the engine 20 and the propulsion generated by the jet pump 30 is controlled by an operation of turning a throttle lever 13a (refer to FIG. 2) of the steering handle 13. The deflector 38 is linked with the steering handle 13 via a control wire (not shown) and is turned by the operation of the handle 13, thereby enabling the course of the boat body 11 to be changed by the operator.

FIG. 3 is a cross sectional view of jet pump 30. The jet pump 30 has a stator duct 31 forming the channel 18 in communication with the intake 17 (refer to FIG. 1) provided on the bottom of the boat body 11. The impeller 32 is disposed in the stator 31, a bearing 33 of the impeller is provided in the stator 31, and a cap 34 for closing the rear end of the bearing 33 is also provided. The jet pump 30 is attached to the hull 14 so as to be removable by fixing a flange 31d formed in the front portion of the stator 31 by a bolt (not shown). The stator 31 has an impeller housing part 31a, a bearing housing part 31b, and a nozzle part 31c (refer to FIG. 1). The impeller housing part 31a and the bearing housing part 31b are formed integrally. The bearing 33 is integrally formed within the bearing housing part 31b via a stationary blade 31b1.

A front part of a boss 32a of the impeller 32 is engaged with a spline 22b formed in the rear end of the drive shaft 22, so that the impeller 32 integrally rotates with the drive shaft 22. The front end 22a of the drive shaft 22 is coupled to the output shaft 21 of the engine 20 and is mounted on the boat body 11 via the coupler 23 (FIG. 1). An impeller shaft 35 for supporting the rear part 32b of the boss 32a of the impeller 32 is rotatably supported by the bearing 33 via ball bearings 33a and 33b. A male screw 35a is formed at the tip of the impeller shaft 35 and is screwed in a female screw portion formed in the rear part 32b of the boss of the impeller 32, thereby coupling the impeller 32 and the impeller shaft 35.

The front part of the boss 32a of the impeller 32 is coupled to the drive shaft 22, the rear part 32b of the boss is coupled to the impeller shaft 35, and the impeller 32 rotates with the drive shaft 22 and the impeller shaft 35. A collar 40 is attached to the periphery of the impeller shaft 35, and a waterproof seal 37 is provided between the collar 40 and the bearing 33 of the stator. Therefore, water does not enter the bearing 33 from the gap between the bearing 33 and the collar 40.

The collar 40 is also coupled to the rear part 32b of the boss of the impeller 32 via a waterproof seal 42. Therefore, water does not enter from the gap C between the collar 40 and the rear part 32b of the boss of the impeller 32 toward the peripheral face of the impeller shaft 35. In the aforementioned embodiment, the waterproof seal 42 is an O ring attached to a ring-shaped groove 41 formed in the peripheral face of the collar 40. In the boss 32a of the impeller, a buffer 50 for the rear end 22c of the drive shaft is provided between the front end 35b of the impeller shaft 35 and the rear end 22c of the drive shaft 22. The peripheral portion of the buffer 50 is formed in a shape such that air escapes from the impeller shaft 35 side toward the drive shaft 22 side when said impeller shaft 35 is screwed into the boss 32a of the impeller. The buffer 50 is made of rubber in a preferred embodiment.

FIG. 4 is a diagram showing the buffer 50; FIG. 4A is a view seen from the back of the ship body, and FIG. 4B is a partial cutaway side view of FIG. 4A. As shown in FIGS. 3 and 4, the buffer 50 has an engagement part 51 with a screw hole 32c in the boss 32a of the impeller and a large diameter part 53 closely attached to the internal face of the boss 32a of the impeller. An air escape groove 54 extending from an external face 52 of the engagement part 51 to some midpoint of the large diameter part 53 is formed.

When the air escape groove 54 is formed, at the time of screwing the impeller shaft 35 into the boss 32a of the impeller, air (or grease) existing between the front end 35b of the impeller shaft and the buffer 50 is guided to the air escape groove 54 in association with screwing of the impeller shaft 35. The air or grease escapes from the front end portion 54a of the air escape groove 54 toward the drive shaft 22 side while slightly deforming the large diameter part 53. Since the drive shaft 22 and the impeller shaft 35 are spline-connected, the air (or grease) can escape along the spline. After screwing the impeller shaft 35 into the boss 32a of the impeller, the large diameter part 53 of the buffer 50 is closely attached to the internal face of the boss 32a of the impeller. Consequently, the buffer 50 also plays the role of interrupting water entering from the drive shaft 22 side to the impeller shaft 35 side.

FIG. 5 is a diagram showing a modification of the buffer. A buffer 55 is constructed in such a manner that a large diameter part 56 which is closely attached to the inner face of the boss 32a is formed in a ring-shaped, thin seal with a lip to make air (or grease) easily escape toward the drive shaft 22 side. At the time of screwing the impeller shaft 35 into the boss 32a of the impeller, air (or grease) existing between the front end 35b of the impeller shaft and the buffer 50 slightly deforms the seal lip 56 in association with the screwing of the impeller shaft 35 and escapes towards the drive shaft 22 side. After the impeller shaft 35 is screwed into the boss 32a of the impeller, the seal lip 53 is closely attached to the internal face of the boss 32a of the impeller. Consequently, the buffer 55 also plays the role of interrupting water entering from the drive shaft 22 side to the impeller shaft 35 side.

As shown in FIG. 3, in the front part of the cap 34, an insertion part (cylindrical part) 34b to the rear part of the bearing 33 is formed and three insertion holes 34c (only one insertion hole is shown) of screws 36 are also formed. In the cylindrical insertion part 34b, an attachment groove of an O ring 34e is formed. Therefore, the cap 34 is attached to the rear part of the bearing 33 by attaching the O ring 34e to the insertion part 34b, inserting (force-fitting) the insertion part 34b into the rear part of the bearing 33 as shown in FIG. 3, and screwing the insertion part 34b with the screws 36.

In a state where the cap is attached, invasion of water to the bearing 33 is interrupted by the O ring 34e. A partial notch 34d is formed in a contact face with the bearing 33 of the cap 34. The cap 34 can be easily detached by unscrewing the screws 36 and inserting the tip of a tool (for example, a driver) into the notch 34df or maintenance.

The water jet propulsion apparatus as described above produces the following beneficial actions and effects. The water jet propulsion apparatus includes the stator 31 forming the channel 18, the impeller 32 rotatably disposed in the stator 31, the impeller shaft 35 rotatably supported in the stator 31 and coupled to the impeller 32, and the collar 40 provided around the impeller shaft 35. The waterproof seal 37 is provided between the collar 40 and the stator 31, and the collar 40 is coupled to the impeller 32 via the waterproof seal 42. Consequently, water does not enter from the gap C between the collar 40 and the impeller 32 toward the impeller shaft 35.

Therefore, corrosion of the surface of the impeller shaft 35 is reduced or eliminated and it is not always necessary to make the impeller shaft of a corrosion-resistant material (such as stainless steel). Since the impeller shaft 35 can be made of iron or the like, the price of the impeller shaft 35 can be reduced. Preferably, the collar 40 is made of a corrosion-resistant material (such as stainless steel). The impeller shaft 35 is screwed to the rear part of the impeller 32. A drive shaft 22 is coupled to the front part of the impeller 32 by splining. The impeller shaft 35 and the impeller 32 can be detached in a coupled state from the drive shaft.

By detaching the bolt fixing the jet pump 30 to the boat body 11, the whole jet pump 30 can be taken out to the rear side. Since the buffer 50 (or 55) for the rear end 22c of the drive shaft is provided between the front end 35b of the impeller shaft 35 in the impeller 32 and the rear end 22c of the drive shaft 22, a shock at the time of attaching the impeller 32 to the rear end 22c of the drive shaft is lessened. In the case of such a configuration, if it is assumed that no such measure had been taken, air or grease existing between the impeller shaft 35 and the buffer 50 or 55 cannot escape when the impeller shaft 35 is screwed to the rear part of the impeller 32. In addition, the buffer 50 is excessively deformed.

In contrast, in the water jet propulsion apparatus of the above-described embodiment, the peripheral portion of the buffer 50 (or 55) is formed in a shape such that air escapes from the impeller shaft 35 side toward the drive shaft 22 side when the impeller shaft is secured in place. Thus, excessive deformation of the buffer 50 can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water jet propulsion apparatus comprising:
   a stator forming a channel;
   an impeller rotatably disposed within the stator;
   an impeller shaft rotatably supported in said stator and coupled to said impeller;
   a collar provided around the impeller shaft; and
   a waterproof seal provided between the collar and the stator, wherein the collar is coupled to said impeller via the waterproof seal.

2. The water jet propulsion apparatus according to claim 1, wherein said impeller shaft is screwed to a rear part of the impeller.

3. The water jet propulsion apparatus according to claim 1, further comprising:
   a drive shaft being spline-connected to the front part of the impeller; and
   a buffer for a rear end of the drive shaft being provided within the propeller between a front end of said impeller shaft and the rear end of the drive shaft.

4. The water jet propulsion apparatus according to claim 3, wherein a peripheral portion of the buffer is formed in a shape permitting an escape of air from the impeller shaft toward the drive shaft when said impeller shaft is secured with said buffer.

5. The water jet propulsion apparatus according to claim 2, further comprising:
   a drive shaft being spline-connected to the front part of the impeller; and
   a buffer for a rear end of the drive shaft being provided within the propeller between a front end of said impeller shaft and the rear end of the drive shaft.

6. The water jet propulsion apparatus according to claim 5, wherein a peripheral portion of the buffer is formed in a shape permitting an escape of air from the impeller shaft toward the drive shaft when said impeller shaft is secured with said buffer.

7. The water jet propulsion apparatus according to claim 3, wherein a peripheral portion of the buffer is formed in a shape permitting an escape of air from the impeller shaft toward the drive shaft when said impeller shaft is secured with said buffer, said buffer including
   an engagement portion for engaging a screw hole in the boss of the impeller,
   a large diameter portion being attached to an internal face of the boss of the impeller, and
   at least one air escape groove extending from an external face of the engagement portion to a midpoint of the large diameter portion.

8. The water jet propulsion apparatus according to claim 5, wherein a peripheral portion of the buffer is formed in a shape permitting an escape of air from the impeller shaft toward the drive shaft when said impeller shaft is secured with said buffer, said buffer including
   an engagement portion for engaging a screw hole in the boss of the impeller,
   a large diameter portion being attached to an internal face of the boss of the impeller, and
   at least one air escape groove extending from an external face of the engagement portion to a midpoint of the large diameter portion.

9. The water jet propulsion apparatus according to claim 3, wherein the buffer is made from rubber.

10. The water jet propulsion apparatus according to claim 8, wherein the buffer is made from rubber.

11. The water jet propulsion apparatus according to claim 3, wherein a peripheral portion of the buffer is formed in a shape permitting an escape of air from the impeller shaft toward the drive shaft when said impeller shaft is secured with said buffer, said buffer including an engagement portion for engaging a screw hole in the boss of the impeller, a large diameter portion being attached to an internal face of the boss of the impeller, and a ring-shaped, thin seal having a lip permitting an escape of air, wherein said ring-shaped, thin seal is integrally formed within said large diameter portion.

12. A water jet propulsion apparatus comprising:

a stator forming a channel;

an impeller rotatably disposed within the stator;

an impeller shaft rotatably supported in said stator and coupled to said impeller, wherein said impeller shaft is screwed to a rear part of the impeller;

a collar provided around the impeller shaft;

a waterproof seal provided between the collar and the stator, wherein the collar is coupled to said impeller via the waterproof seal;

a drive shaft being spline-connected to the front part of the impeller; and a rubber buffer for a rear end of the drive shaft being provided within the propeller between a front end of said impeller shaft and the rear end of the drive shaft, said buffer including an engagement portion for engaging a screw hole in the boss of the impeller and a large diameter portion being attached to an internal face of the boss of the impeller.

* * * * *